Patented Apr. 2, 1935

1,996,593

UNITED STATES PATENT OFFICE 1,996,593

VULCANIZATION OF CAOUTCHOUC

Erwin Schwenk, Berlin-Westend, and Hans Jordan, Glienicke, Germany, assignors to Schering-Kahlbaum A. G., Berlin, Germany No Drawing. Application March 18, 1933, Serial No. 661,580. In Germany March 22, 1932

5 Claims. (Cl. 18—53)

Our invention relates to the vulcanization of caoutchouc and more especially to means for accelerating this process. The pentamethylene dithiocarbamate of piperidines obtainable by acting with carbon disulfide in the presence or absence of a solvent on piperidine is known to accelerate vulcanization, but it has hitherto been believed to be unfit for use since its accelerating effect is so enormous that in vulcanization mixtures containing it vulcanization begins already during mere storage. In a great many cases, an accelerator possessing such an extraordinary activity is undesirable since it renders the treatment of the mixtures very difficult.

It has been tried to reduce the overgreat activity of the pentamethylene dithiocarbamate of piperidine by adding other substances, for instance a mixture of different butylamines, however this mode of proceeding has not led to an extended practical use of the substance.

We have found that the pentamethylene dithiocarbamate of piperidine can be rendered useful for the purpose in view by using mixed dithiocarbamates corresponding to the general formula

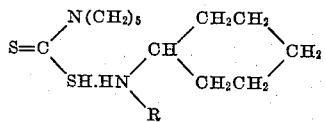

wherein R is hydrogen or alkyl.

These new compounds are obtained if carbon disulfide is made to act in the presence or absence of a solvent on an equimolecular mixture of piperidine or a homologue of piperidine with other primary or secondary bases. Alternatively free substituted dithiocarbamic acid may be made to react with a basic compound other than the corresponding starting base.

Thus for instance, when acting with carbon disulfide on an equimolecular mixture of piperidine and cyclohexylamine, there is obtained a mixture of the two possible combinations, viz. a mixture consisting for the greater part of cyclohexylamine pentamethylene dithiocarbamate and some piperidine cyclohexyl dithiocarbamate.

The compounds thus obtainable have excellent accelerating properties and are far superior to similar accelerators hitherto known.

The accelerating effects of such compounds are illustrated by the following examples:—

Example 1

A mixture of

| | |
|---|---|
| Caoutchouc | 500 parts by weight |
| Sulfur | 15 parts |
| Red lead | 25 to 50 parts |
| Cyclohexylamine pentamethylene dithiocarbamate | 5 to 6 parts |
| Stearic acid | 2 parts | is vulcanized at about 150° C. for 7 to 10 minutes. If operating at a lower temperature, vulcanization will require a correspondingly longer time.

Example 2

A mixture prepared with

| | Parts |
|---|---|
| Caoutchouc | 100 |
| Carbon black | 25 |
| Zinc oxide | 5 |
| Sulfur | 3 |
| Cyclohexyl ethylamine pentamethylene dithiocarbamate | .25 | is vulcanized for 20 minutes at 130° C.

Various changes may be made in the details disclosed in the foregoing specification without departing from the invention or sacrificing the advantages thereof.

We claim:—

1. The pentamethylene dithiocarbamates corresponding to the formula

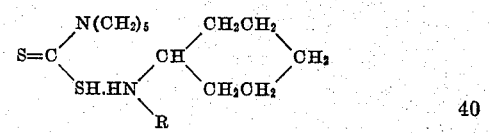

wherein R is hydrogen or alkyl.

2. Cyclohexylamine pentamethylene dithiocarbamate corresponding to the formula

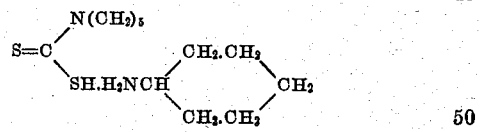

3. Cyclohexyl ethylamine pentamethylene dithiocarbamate corresponding to the formula

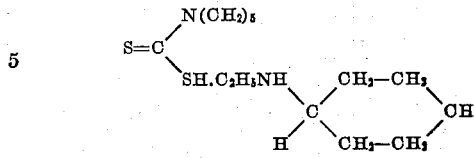

4. The method of producing mixed dithiocarbamates corresponding to the general formula

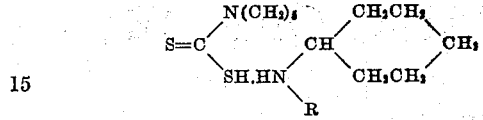

wherein R is hydrogen or alkyl, comprising acting with carbon disulfide on an equimolecular mixture of piperidine and cyclohexylamine.

5. The method of vulcanizing caoutchouc comprising mixing caoutchouc, sulfur and a filler with a pentamethylene dithiocarbamate of the general formula

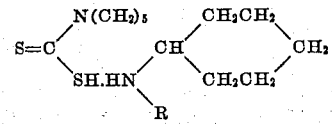

wherein R is hydrogen or alkyl, and heating the mixture.

ERWIN SCHWENK.
HANS JORDAN.